(12) United States Patent
Brockett et al.

(10) Patent No.: US 8,972,240 B2
(45) Date of Patent: Mar. 3, 2015

(54) USER-MODIFIABLE WORD LATTICE DISPLAY FOR EDITING DOCUMENTS AND SEARCH QUERIES

(75) Inventors: Christopher John Brockett, Bellevue, WA (US); William Brennan Dolan, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 193 days.

(21) Appl. No.: 13/212,973

(22) Filed: Aug. 18, 2011

(65) Prior Publication Data

US 2012/0296635 A1 Nov. 22, 2012

Related U.S. Application Data

(60) Provisional application No. 61/487,910, filed on May 19, 2011.

(51) Int. Cl.
*G06F 17/27* (2006.01)
*G06F 17/21* (2006.01)
(Continued)

(52) U.S. Cl.
CPC ...... *G06F 17/30637* (2013.01); *G06F 17/2229* (2013.01); *G06F 17/24* (2013.01);
(Continued)

(58) Field of Classification Search
CPC ............. G06F 3/0482; G06F 17/3089; G06F 17/2247; G06F 3/04817; G06F 8/34; G06F 3/0481; G06F 9/4446; G06F 3/0486; G06F 17/289; G06F 17/30864; G06F 21/6218; G06F 17/30707; G06F 17/2785; G06F 17/30616; G06F 17/30286; G06F 17/20; G06F 17/27; G06F 17/2705; G06F 17/279; G06Q 10/10; G06Q 30/02; H04L 29/0809; H04N 5/44543; G10L 15/08
USPC ........ 704/9, 276, 10, 277, 255; 707/769, 722, 707/723, 706, 786, 740, 736, 705, 728, 748, 707/749, 771, 739, 738, 609, 758, 702; 715/762, 835, 753, 738, 854, 716, 708, 715/769, 828, 810, 760, 781, 712, 766, 234, 715/841, 764, 711, 705, 700, 822, 838, 763, 715/236

See application file for complete search history.

(56) References Cited

U.S. PATENT DOCUMENTS 6,055,515 A * 4/2000 Consentino et al. ......... 705/27.1
6,134,563 A * 10/2000 Clancey et al. ............... 715/210
(Continued)

OTHER PUBLICATIONS

C. Collins, M. S. T. Carpendale, and G. Penn. Visualization of uncertainty in lattices to support decision-making. In EuroVis, pp. 51-58, 2007.*

(Continued)

*Primary Examiner* — Paras D Shah
*Assistant Examiner* — Anne Thomas-Homescu
(74) *Attorney, Agent, or Firm* — Heikki Einola; Judy Yee; Micky Minhas (57) ABSTRACT

An "Interactive Word Lattice" provides a user interface for interacting with and selecting user-modifiable paths through a lattice-based representation of alternative suggested text segments in response to a user's text segment input, such as phrases, sentences, paragraphs, entire documents, etc. More specifically, the user input is provided to a trained paraphrase generation model that returns a plurality of alternative text segments having the same or similar meaning as the original user input. An interactive graphical lattice-based representation of the alternative text segments is then presented to the user. One or more words of each alternative text segment represents a "node" of the lattice, while each connection between nodes represents a lattice "edge. Both nodes and edges are user modifiable. Each possible path through the lattice corresponds to a different alternative text segment. Users select a path through the lattice to select an alternative text to the original input.

20 Claims, 4 Drawing Sheets

Exemplary UI Window for "Interactive Word Lattice Display" showing Example Input Phrase and Corresponding Lattice (51) Int. Cl.

| | | |
|---|---|---|
| *G06F 17/20* | (2006.01) | |
| *G06F 3/048* | (2013.01) | |
| *G06F 3/00* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/28* | (2006.01) | |
| *G06F 7/00* | (2006.01) | |
| *G06F 17/00* | (2006.01) | |
| *G06F 17/30* | (2006.01) | |
| *G10L 15/00* | (2013.01) | |
| *G10L 15/28* | (2013.01) | |
| *G10L 21/06* | (2013.01) | |
| *G10L 25/00* | (2013.01) | |
| *G10L 21/00* | (2013.01) | |

(52) U.S. Cl.
CPC ........ *G06F 17/2795* (2013.01); *G06F 17/2836* (2013.01)
USPC .......... 704/9; 704/10; 704/276; 704/277; 704/255; 707/736; 707/706; 707/786; 707/740; 707/769; 707/702; 707/705; 707/728; 707/748; 707/749; 707/771; 707/739; 707/738; 707/722; 707/609; 707/758; 715/753; 715/738; 715/854; 715/716; 715/708; 715/769; 715/828; 715/810; 715/760; 715/781; 715/712; 715/766; 715/234; 715/841; 715/764; 715/711; 715/705; 715/700; 715/822; 715/838; 715/763; 715/236

(56) References Cited

U.S. PATENT DOCUMENTS

| | | | |
|---|---|---|---|
| 6,415,258 B1* | 7/2002 | Reynar et al. ............... 704/275 |
| 6,424,358 B1* | 7/2002 | DiDomizio et al. ......... 715/762 |
| 6,452,611 B1* | 9/2002 | Gerba et al. ................. 715/721 |
| 6,523,028 B1* | 2/2003 | DiDomizio et al. ......... 707/748 |
| 7,013,289 B2* | 3/2006 | Horn et al. ................ 705/14.51 |
| 7,089,236 B1* | 8/2006 | Stibel ............................... 1/1 |
| 7,181,438 B1* | 2/2007 | Szabo ............................... 1/1 |
| 7,752,034 B2* | 7/2010 | Brockett et al. ................ 704/9 |
| 7,752,243 B2* | 7/2010 | Hoeber et al. ................ 707/765 |
| 8,135,660 B2* | 3/2012 | Au .................................. 706/55 |
| 8,150,736 B2* | 4/2012 | Horn et al. ................... 705/26.1 |
| 8,214,210 B1* | 7/2012 | Woods .......................... 704/236 |
| 8,438,142 B2* | 5/2013 | Wu et al. ....................... 707/705 |
| 8,700,620 B1* | 4/2014 | Lieberman ................... 707/728 |
| 2002/0052880 A1* | 5/2002 | Fruensgaard et al. ..... 707/104.1 |
| 2004/0193401 A1* | 9/2004 | Ringger et al. ................. 704/9 |
| 2005/0005266 A1* | 1/2005 | Datig ............................ 717/136 |
| 2005/0114324 A1* | 5/2005 | Mayer ............................. 707/3 |
| 2005/0119995 A1* | 6/2005 | Lee ................................. 707/3 |
| 2005/0165600 A1* | 7/2005 | Kasravi et al. ................. 704/9 |
| 2006/0129591 A1* | 6/2006 | Ramsey et al. ............... 707/102 |
| 2006/0195461 A1* | 8/2006 | Lo et al. ....................... 707/100 |
| 2008/0255835 A1* | 10/2008 | Ollason et al. ............... 704/231 |
| 2008/0319947 A1* | 12/2008 | Latzina et al. ................. 707/3 |
| 2009/0070322 A1* | 3/2009 | Salvetti et al. ................. 707/5 |
| 2009/0327279 A1* | 12/2009 | Adachi et al. .................. 707/5 |
| 2010/0070448 A1* | 3/2010 | Omoigui ....................... 706/47 |
| 2010/0169333 A1* | 7/2010 | Matsuka ...................... 707/758 |
| 2010/0275156 A1* | 10/2010 | Hoyer et al. .................. 715/803 |
| 2010/0306187 A1* | 12/2010 | Arrouye et al. .............. 707/711 |
| 2010/0313118 A1* | 12/2010 | Acquaviva ................... 715/254 |
| 2010/0318551 A1* | 12/2010 | Lai ............................... 707/765 |
| 2011/0004480 A1* | 1/2011 | Shen ............................. 705/1.1 |
| 2011/0029534 A1* | 2/2011 | Maeda et al. ................ 707/738 |
| 2011/0047145 A1* | 2/2011 | Ershov ......................... 707/722 |
| 2011/0060712 A1* | 3/2011 | Harashima et al. ............ 706/47 |
| 2011/0066970 A1* | 3/2011 | Burrier et al. ................ 715/782 |
| 2011/0184946 A1* | 7/2011 | Hennum et al. .............. 707/728 |
| 2011/0239112 A1* | 9/2011 | Nakano ........................ 715/261 |
| 2012/0030226 A1* | 2/2012 | Holt et al. .................... 707/766 |
| 2012/0042242 A1* | 2/2012 | Garland et al. .............. 715/256 |
| 2012/0046782 A1* | 2/2012 | Schulze et al. ............... 700/187 |
| 2012/0078945 A1* | 3/2012 | Hurst ............................ 707/769 |
| 2012/0084281 A1* | 4/2012 | Colosi .......................... 707/723 |
| 2012/0096042 A1* | 4/2012 | Brockett et al. ............. 707/798 |
| 2012/0117058 A1* | 5/2012 | Rubinstein et al. .......... 707/723 |
| 2012/0124051 A1* | 5/2012 | Lin et al. ...................... 707/739 |
| 2012/0143858 A1* | 6/2012 | Vaananen .................... 707/723 |
| 2012/0150883 A1* | 6/2012 | Keith, Jr. ...................... 707/756 |
| 2012/0173243 A1* | 7/2012 | Anand et al. ............... 704/270.1 |
| 2012/0179701 A1* | 7/2012 | Arrouye et al. .............. 707/758 |
| 2012/0191716 A1* | 7/2012 | Omoigui ...................... 707/740 |
| 2012/0221581 A1* | 8/2012 | Narayanan et al. .......... 707/748 |
| 2012/0239381 A1* | 9/2012 | Heidasch ......................... 704/9 |
| 2012/0246153 A1* | 9/2012 | Pehle ........................... 707/723 |
| 2012/0265744 A1* | 10/2012 | Berkowitz et al. .......... 707/705 |
| 2012/0265786 A1* | 10/2012 | Arrouye et al. .............. 707/775 |
| 2012/0271831 A1* | 10/2012 | Narayanan et al. .......... 707/741 |
| 2013/0013634 A1* | 1/2013 | Buchheit et al. ............. 707/769 |
| 2013/0173614 A1* | 7/2013 | Ismalon ....................... 707/733 |
| 2013/0185074 A1* | 7/2013 | Gruber et al. ................ 704/257 |
| 2014/0040300 A1* | 2/2014 | Narayanan et al. .......... 707/758 |
| 2014/0067378 A1* | 3/2014 | Anand et al. .................... 704/9 |
| 2014/0114649 A1* | 4/2014 | Zuev et al. ....................... 704/9 |
| 2014/0122516 A1* | 5/2014 | Brewer et al. ............... 707/767 |
| 2014/0181100 A1* | 6/2014 | Ramer et al. ................ 707/728 |
| 2014/0195517 A1* | 7/2014 | Buchheit et al. ............. 707/722 |
| 2014/0207751 A1* | 7/2014 | Musgrove .................... 707/706 |
| 2014/0229477 A1* | 8/2014 | Costello et al. ............. 707/731 |

OTHER PUBLICATIONS

R. Rajapakse, M. Denham, "Text retreval with more realistic concept matching and reinforcement learning". Information Processing and Management 42 (2006) 1260-1275.*

M. Wattenberg, F. Viegas, "The Word Tree, an Interactive Visual Concordance". IEEE Transactions on Visualization and Computer Graphics, vol. 14, No. 6, Nov./Dec. 2008.*

Heim, et al., "Facet Graphs: Complex Semantic Querying Made Easy", In Proceedings of 7th Extended Semantic Web Conference, Springer, May 30-Jun. 3, 2010, vol. 6088, pp. 288-302.

Riehmann, et al., "The Netspeak Wordgraph: Visualizing Keywords in Context", IEEE Pacific Visualization Symposium, 2011, pp. 123-130.

Filho, et al., "A visualization interface for interactive search refinement", HCIR, 2009, pp. 4.

Mercun, et al., "Visualizing for Exploration and Discovery", May 24-28, 2010, pp. 11.

"WhatDoYouSuggest: Explore Topics Based on Internet User Trends", http://www.makeuseof.com/dir/whatdoyousuggest-internet-user-trends/, Retrieved Date: May 10, 2011, pp. 2.

"Visual Thesaurus", http://www.visualthesaurus.com/, Retrieved Date: May 10, 2011, pp. 4.

* cited by examiner

Exemplary UI Window for "Interactive Word Lattice Display" showing Example Input Phrase and Corresponding Lattice

USER-MODIFIABLE WORD LATTICE DISPLAY FOR EDITING DOCUMENTS AND SEARCH QUERIES

CROSS-REFERENCE TO RELATED APPLICATIONS

This application claims the benefit under Title 35, U.S. Code, Section 119(e), of a previously filed U.S. Provisional Patent Application Ser. No. 61/487,910, filed May 19, 2011, and entitled "USER-MODIFIABLE WORD LATTICE DISPLAY FOR EDITING DOCUMENTS AND SEARCH QUERIES".

BACKGROUND

1. Technical Field

An "Interactive Word Lattice," provides a user interface for interacting with and selecting user-modifiable paths through a lattice-based representation of alternative suggested text segments provided in response to an input text segment.

2. Background Art

Proofing tools and other forms of authorial and editorial assistance often provide users with suggested corrections (e.g., spelling, grammatical, etc.) to an input text segment, such as a word, phrase, sentence, etc., in the form of a drop-down graphical user interface or the like that presents a set of simple alternatives to choose from. These types of interfaces are generally inflexible and typically present only a small subset of the often complex range of alternatives that are actually available to the writer.

Similarly, query suggestions provided by search engines in response to a user provided query do not provide an intuitive way of combining multiple queries or search terms. For example, some search engines many provide a simple list of possible alternative queries to a user provided input query. Each of these alternative queries is then generally individually selected or otherwise provided to the search engine by the user. Further, search engines that may provide alternative queries fail to provide a mechanism for combining various elements of those alternative queries. In addition, members of the general public are generally unaware of how to formulate a query using complex query syntax that may be understood by a particular search engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, an "Interactive Word Lattice," as described herein, provides a user interface for interacting with and selecting user-modifiable paths through a lattice-based representation of alternative suggested text segments provided in response to a user's text segment input, including phrases, sentences, paragraphs, or entire documents. Note also that, in various embodiments, the suggested alternative text segments provided in the lattice-based representation also include the original text segment input provided by the user. Further, it should also be noted that a "text segment" as discussed herein is specifically defined as any sequence of strings representing language, and may range in size from document, to paragraph, to sentence, sequence of words (phrase) or word, or smaller, and further may include sub word-level units such as morphemes and even characters.

In the case of larger text inputs, such as paragraphs or entire documents, separate lattice-based representations of alternative suggested text segments are generated for each of multiple user-adjustable subsections or windowed text portions extracted from the larger text input, with the length of each subsection or windowed portion generally being on the order of about one sentence in length. However, for purposes of explanation, the following discussion will generally refer to a singular "text segment" received as input to the Interactive Word Lattice for generating a single lattice-based representation of the corresponding alternative suggested text segments.

More specifically, in various embodiments, the Interactive Word Lattice receives a text input from the user. This input is then provided to a previously trained "contextual semantic similarity generation module" capable of generating multiple outputs of semantically-related text segments appropriate to the context of the input. In its simpler embodiments, the "contextual semantic similarity generation module" may comprise one or more thesauri or like databases of semantically similar words and phrases, either machine learned or curated, used in conjunction with a language model or one of any number of models designed to select or rank the output text segments.

One well-known and widely used exemplar of a "contextual semantic similarity generation module" is a machine translation engine. A conventional machine translation engine comprises a statistically derived table or tables containing mappings between text segments, a decoder to select particular paths among alternative and outputs, and one or more trained statistical language models. The machine translation engine may also include other models (e.g., topic models, context models, etc.) that evaluate an input text segment and its component words or phrases to identify a plurality of alternative text segments having the same or similar meaning to the input text segment. However, it should be understood that in the more general case, the Interactive Word Lattice uses any type of paraphrase generation or contextual thesaurus based techniques to process the input text segment. Machine translation is simply one example such techniques that is not intended to limit the scope of paraphrase generation techniques that are adaptable for use by the Interactive Word Lattice.

Note that in various embodiments, these types of trained statistical models can identify alternative text segments in the same language (e.g., English input-English output) or a different language (e.g., Chinese input-French output, etc.). Within the same language, they can identify alternative text segments between styles or dialects, or alternatives to the text input within the same general style or dialect. However, in the context of the following discussion, the general intent is to provide both the input and output of the Interactive Word Lattice in the same language. Thus, unless specifically described or claimed as a bilingual input-output example or case, it should be assumed that the Interactive Word Lattice is working within a single language, though this may also include different styles and dialects within that single language. Therefore, for purposes of explanation, the following discussion will generally refer to the case where the Interactive Word Lattice generates a lattice-based representation of the alternative suggested text segments having the same or similar meaning in the same language, e.g., as in a contextual thesaurus. Further, it should be noted that the "text input" provided by the user can be provided via an actual text input (e.g., typed or read from a text file or document), or it can be provided by any other desired mechanism, including speech recognition, etc.

Once the contextual semantic similarity generation module has generated a set of alternative suggested text segments (also referred to herein as a "list of suggestions") in response to the user text input, the contextual semantic similarity generation module then provides the alternative text segments to a "lattice generation module" that constructs a graphical lattice-based representation of the alternative text segments. For example, in the case of input text segments such as "spending cuts" a mapping to an output phrase such as "reductions in expenditures" involves larger segments than a simple single word to word mapping, and in view of this example, it should also be evident that the general order of the words may be reversed (e.g., "spending cuts" to "reduced expenditures") so long as the output is a semantically similar text segment, term, or phrase).

Figure 4:
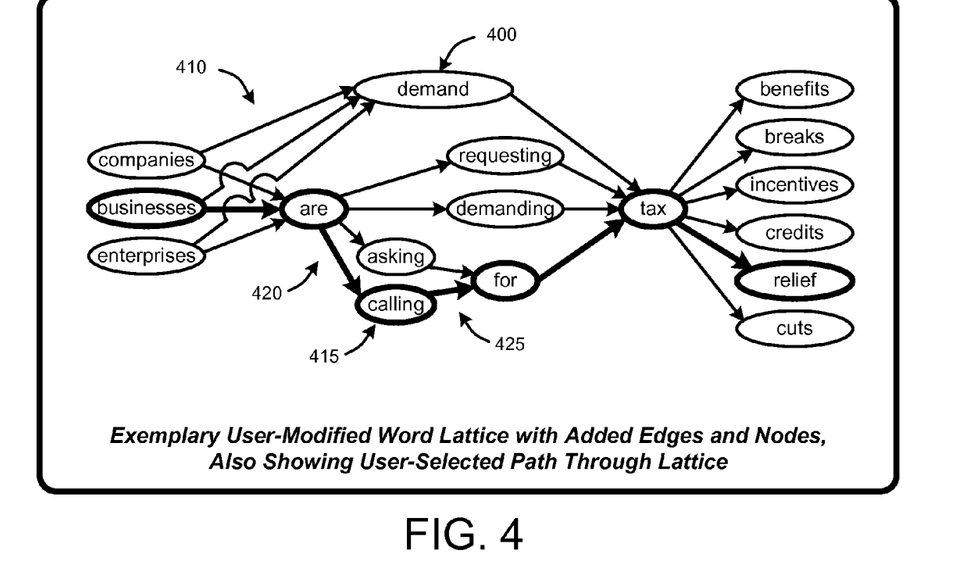
FIG. 4 provides an example of the lattice-based representation of alternative suggested text segments illustrated in FIG. 4 following user modification of the lattice-based representation of alternative suggested text segments to add new nodes and edges, and further showing a user-selected path through the lattice-based representation of alternative suggested text segments, as described herein.

Note that the lattice constructed by the Interactive Word Lattice does not directly connect semantically similar terms, but instead presents them as parallel text segments connected by linguistic context (see FIG. 4 for example). In particular, each word or connected sequence of words in each of the text segments represents a "node" of this lattice-based representation, while connections between each word represent "edges" of the lattice connecting various nodes of the lattice. In general, each node includes one or more edges connecting each node to one or more other nodes. As a result, there are generally a large number of potential "paths" from the beginning of the lattice to the end of the lattice, with each such "path" representing a different text segment that may or may not correspond to one of the alternative suggested text segments that are optionally presented as a list to the user.

This graphical lattice-based representation of the alternative suggested text segments is then presented to the user along with an optional separate list of the alternative suggested text segments. The possible paths (e.g. nodes and edges) of the graphical lattice-based representation of alternative suggested text segments are user adjustable and user modifiable. In other words, a user selected path through the graphical lattice-based representation can be modified via a user interface by adding or removing nodes or edges, or by editing node labels (i.e., changing or editing the word or words at any particular node). Users can then select a path through the graphical lattice-based representation of alternative text segments (thereby selecting an alternative text segment to the original text input). The selected alternative text segment is then available for use for any desired purpose, such as, for example, to provide a replacement text segment to the original input text segment, to update the user's document, to formulate a search query, to respond to an email or SMS text message, etc. Note that in response to user modifications to the graphical lattice-based representation of alternative text segments, some or all of the associated data (i.e., text segments) in the list of suggestions may also be updated in various embodiments of the Interactive Word Lattice.

In view of the above summary, it is clear that the Interactive Word Lattice described herein provides a user interface for interacting with and selecting user-modifiable paths through a lattice-based representation of alternative suggested text segments constructed in response to an input text segment for use in selecting an alternative to the input text segment. In addition to the just described benefits, other advantages of the Interactive Word Lattice will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, an "Interactive Word Lattice," as described herein, provides a user interface for interacting with and selecting user-modifiable paths through a lattice-based representation of alternative suggested text segments. These alternative text segments are provided by a contextual semantic similarity generation module in response to a user's text segment input that includes words, phrases, sentences, paragraphs, or entire documents. These text segment inputs can be provided via any conventional means, including direct text inputs, speech recognition, data files, etc. Note also that, in various embodiments, the suggested alternative text segments provided in the lattice-based representation also include the original text segment input provided by the user. Further, it should also be noted that a "text segment" as discussed herein is specifically defined as any sequence of strings representing language, and may range in size from document, to paragraph, to sentence, sequence of words (phrase) or word, or smaller, and further may include sub word-level units such as morphemes and even characters.

Note that in the case of larger text segments, such as paragraphs or entire documents, separate lattice-based representations of alternative suggested text segments are generated for each of multiple user-adjustable subsections or windowed text portions extracted from the larger text segment, with the length of each subsection or windowed portion generally being on the order of about one sentence in length. However, for purposes of explanation, the following discussion will generally refer to a singular text segment received as input to the Interactive Word Lattice for generating a single lattice-based representation of the corresponding alternative suggested text segments.

More specifically, in various embodiments, the input text segment is provided to a trained language or machine translation model that, in response, returns a plurality of alternative text segments having either the same or similar meaning as the original input text segment. However, it should be understood that in the more general case, the Interactive Word Lattice uses any type of paraphrase generation or contextual thesaurus based techniques to process the input text segment. Machine translation is simply one example such techniques that is not intended to limit the scope of paraphrase generation techniques that are adaptable for use by the Interactive Word Lattice. An interactive graphical lattice-based representation of the alternative text segments is then presented to the user. Each sub-segment (typically a word, but sometimes a group of words or connected phrases) in each alternative text segment represents a "node" of the lattice (more specifically, the node "label"), while each connection between each sub-segment represents an "edge of the lattice. Both nodes and edges are user modifiable, and, in various embodiments, the user is presented with an interactive capability to add nodes and/or edges, delete nodes and/or edges, and/or to edit the word or character string (e.g., the "label") of any particular node. Each possible path through the lattice corresponds to a different alternative text segment or phrase. Consequently, the user simply selects a path through the lattice (whether or not the user has edited that lattice) to select an alternative text segment to the original input text segment.

Note that in various embodiments of the Interactive Word Lattice, a list of some or all of the alternative text segment is also presented to the user in conjunction with the lattice-based representation of the alternative text segment.

1.1 System Overview

Figure 1:
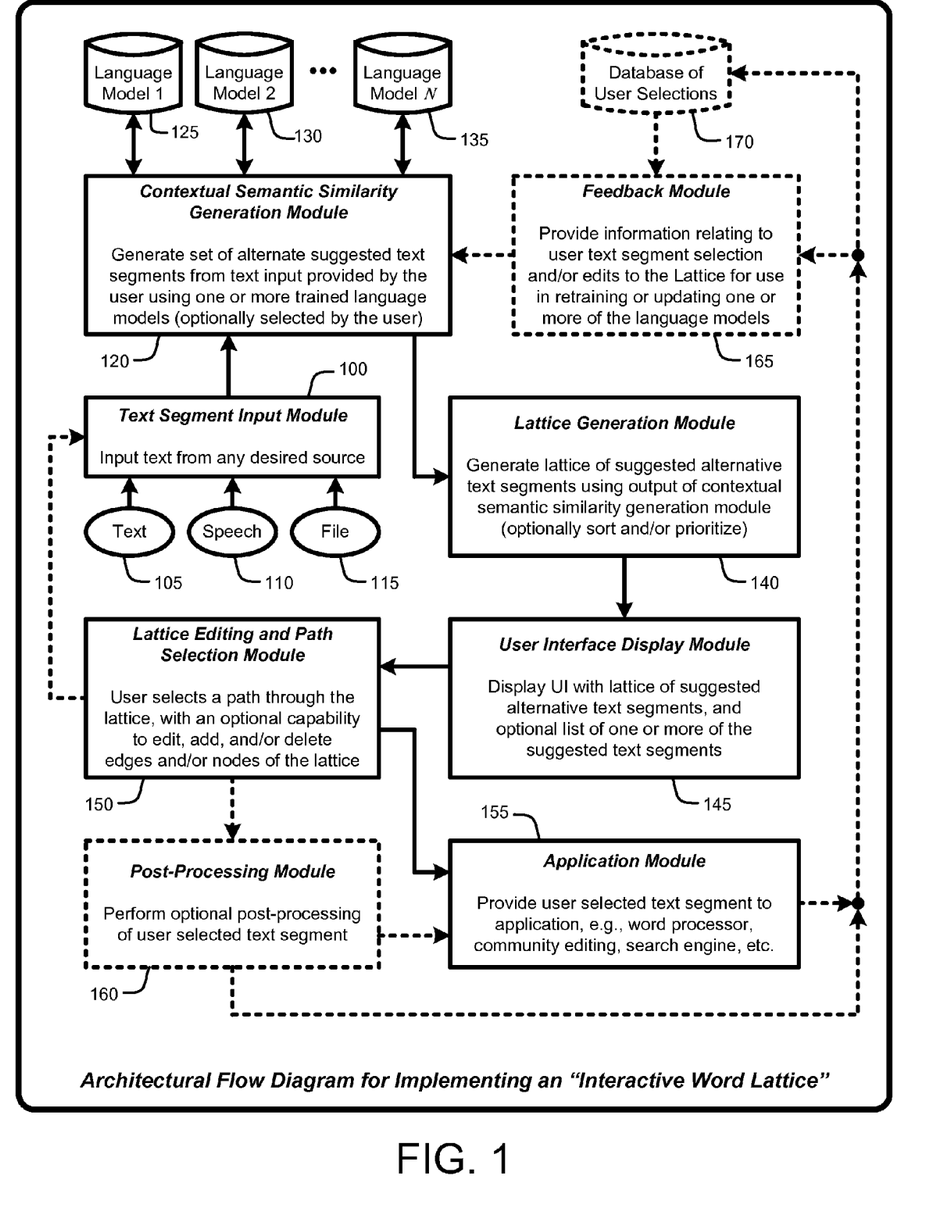
FIG. 1 provides an exemplary architectural flow diagram that illustrates program modules for implementing various embodiments of the Interactive Word Lattice, as described herein.

As noted above, the "Interactive Word Lattice" provides a user interface for interacting with and selecting user-modifiable paths through a lattice-based representation of alternative suggested text segments constructed in response to an input text segment for use in selecting an alternative to the input text segment. The processes summarized above are illustrated by the general system diagram of FIG. 1. In particular, the system diagram of FIG. 1 illustrates the interrelationships between program modules for implementing various embodiments of the Interactive Word Lattice, as described herein. Furthermore, while the system diagram of FIG. 1 illustrates a high-level view of various embodiments of the Interactive Word Lattice, FIG. 1 is not intended to provide an exhaustive or complete illustration of every possible embodiment of the Interactive Word Lattice as described throughout this document.

In addition, it should be noted that any boxes and interconnections between boxes that may be represented by broken or dashed lines in FIG. 1 represent alternate embodiments of the Interactive Word Lattice described herein, and that any or all of these alternate embodiments, as described below, may be used in combination with other alternate embodiments that are described throughout this document.

In general, as illustrated by FIG. 1, the processes enabled by the Interactive Word Lattice begin operation by using a text segment input module 100 to receive an input text segment or other user input text from any desired source. Examples of input sources include, but are not limited to, text 105 inputs (e.g., typing), speech 110 inputs (e.g., speech recognition), file 115 inputs (e.g., text or word processing documents), etc. The input text segment is then provided to a contextual semantic similarity generation module 120 that uses one or more conventional language models (125, 130, 135) to generate a set of alternative suggested text segments from the input text segment provided by the user.

Note that in various embodiments, the user is presented with the capability to select a particular language model (125, 130, 135) for use by the contextual semantic similarity generation module 120. For example, assume that "language model 1" 125 has been trained on a particular writing style corresponding to publications originating from Harvard University, while "language model 2" 130 has been trained on the writings of the author Ernest Hemmingway. In this case, selection of "language model 1" 125 will likely result in significantly different suggested alternative text segments than selection of "language model 2" 130.

In any case, once the contextual semantic similarity generation module 120 has generated the list or set of suggested alternative text segments, these suggested alternative text segments are provided to a lattice generation module 140. As discussed in further detail in Section 2.3, and with respect to FIG. 3 and FIG. 4, the lattice generation module 140 generates a lattice of the suggested alternative text segments as a graph of nodes (one or more words of each text segment) connected by edges showing the flow from one node to the next to illustrate the relationships between each word (or sequence of words) in each of the suggested alternative text segments. Note that the suggested alternative text segments and the order in which particular "equivalent nodes" are arranged in the lattice may be optionally sorted or prioritized in order of likelihood of user selection (based on probabilities computed by the contextual semantic similarity generation module 120). Further, as discussed below with respect to FIG. 3, arrowheads or other graphic devices representing edges may optionally represent the directionality of a "reading flow" of the lattice (e.g., left to right such as in English), which may be reversed in languages such as Arabic or Hebrew in which the orthography flows right to left.

Note that the term "equivalent nodes" refers to one or more nodes of the lattice that have the same general relationship to one or more other nodes in the lattice for generating equivalent alternative text segments. A simple example of equivalent nodes with respect to the input segment "companies are demanding tax breaks" is that the word "companies" (when used as a node in the lattice) may have equivalent nodes of "businesses" or "enterprises" in the lattice. See discussion of FIG. 3 in Section 2.3 for a graphical illustration of this specific example, where the three separate nodes for "companies", "businesses" and "enterprises" are prioritized in the order shown with the highest priority (i.e., most likely) node of "companies shown on the top of the set of three equivalent nodes. Further, sub-segments of this exemplary input, such as "tax breaks" may include many different recommended or suggested alternative text segments such as, for example "reduced taxes" (not shown in FIG. 3 as potential alternatives for purposes of clarity).

Once the lattice generation module 140 has generated the word lattice representing the list or set of suggested alternative text segments, this word lattice is provided to a user interface display module 145 that displays a UI with the word lattice of suggested text segments, along with an optional list of one or more of the suggested text segments. See FIG. 3, discussed in Section 2.3, for an example of the UI populated with a user entered input text segment, a list of suggested alternative text segments, and an interactive word lattice.

In various embodiments, the UI displayed by the user interface display module 145 offers a variety of user interface features (see Section 2.4). However, in the most basic embodiment of the Interactive Word Lattice, a lattice editing and path selection module 150 provides the user with the capability to select a path through the lattice (via user selection of nodes and/or edges of the lattice), along with the optional capability to edit, add, and/or delete edges and/or nodes of the lattice. Selection of a complete path through the lattice results in the selection of a corresponding alternative text segment to the original input text segment.

Once the alternative text segment has been selected by the user via the lattice editing and path selection module 150, the selected alternative text segment is then available for whatever use is desired. For example, in one embodiment, the selected alternative text segment is provided to an application module 155 within which the Interactive Word Lattice is embedded or otherwise operable. Examples of such applications include, but are not limited to word processors, community editing applications, search engines, etc. Note also that in various embodiments, the lattice editing and path selection module 150 provides the user selected alternative text segment back to the text segment input module 100 which in turn provides that text segment as a new input text segment to the contextual semantic similarity generation module 120, as described above. This embodiment allows an iterative refinement that can result in substantial transformations of the original input text segment via two or more passes through the user selection process provided by the lattice editing and path selection module 150.

In addition, in various embodiments, a post-processing module 160 enables various additional processing of the user selected alternative text segment. For example, one simple example of post-processing is to back-translate the user selected alternative text segment to the context of the original input text segment to determine whether the user selected alternative text segment is a statistical or probabilistic equivalent or match to the original input text segment. Other examples of post processing are discussed in Section 2.5

Finally, as illustrated, in various embodiments, the user selected text segment is optionally provided to a feedback module 165 and optionally stored to a database of prior user selections 170. In general, the feedback module 165 provides information relating to user text segment selection and/or edits to the word lattice for use in retraining or updating one or more of the language models (125, 130, 135).

Figure 2:
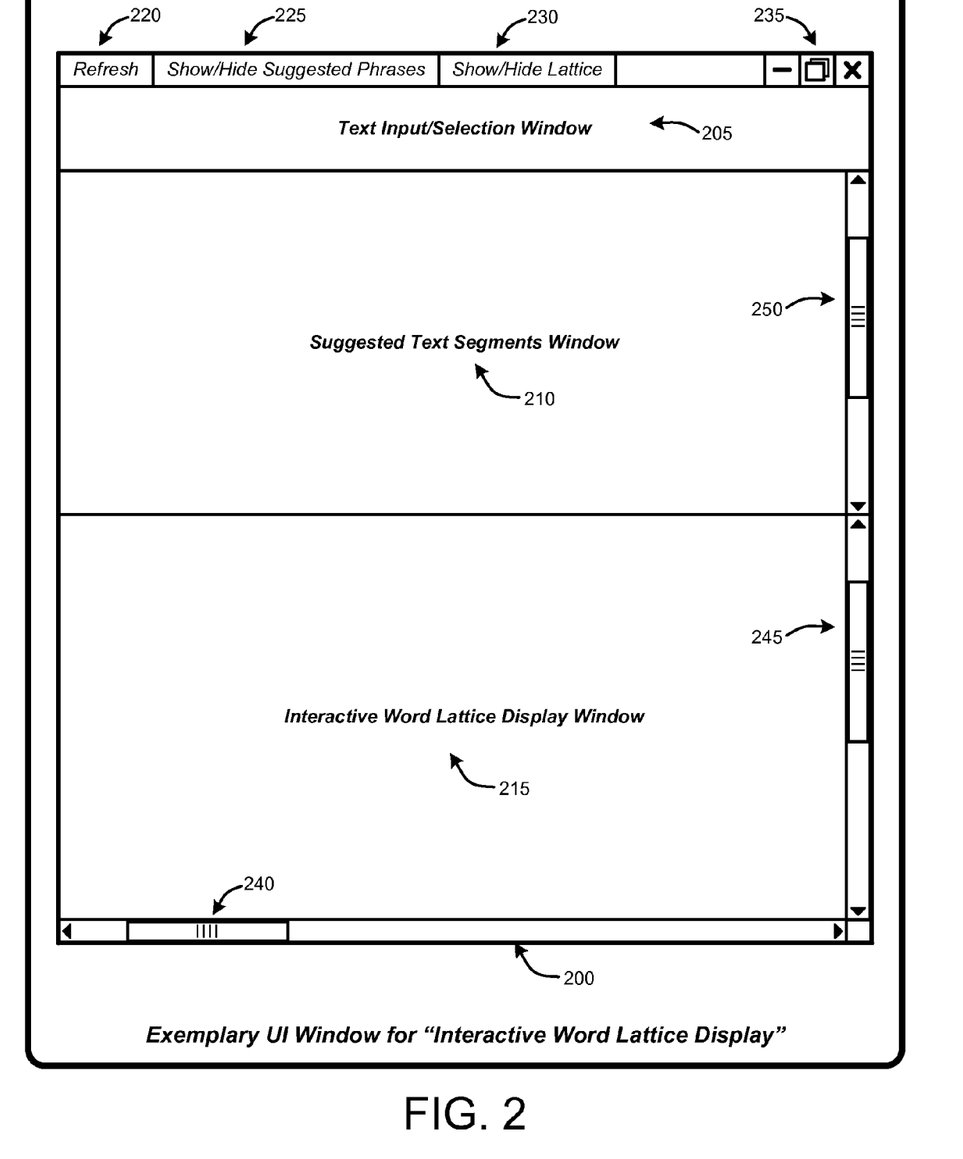
FIG. 2 provides an exemplary user interface layout for various embodiments of the Interactive Word Lattice, showing, as described herein.

FIG. 2 illustrates a simple example of a user interface by which the Interactive Word Lattice may be presented to the user. Note however that FIG. 2 is not intended to limit the manner in which the Interactive Word Lattice is presented to the user, but is instead provided as merely one of many possible user interfaces for implementing the Interactive Word Lattice.

In general, as illustrated by FIG. 2, one exemplary user interface 200 includes a text input/selection window 205 that allows the user to enter, select, and/or edit the input text segment to be processed by the Interactive Word Lattice. As noted above, given the input text segment, a list of suggested alternative text segments is generated by the contextual semantic similarity generation module. Some or all of the suggested alternative text segments are presented to the user in an optional suggested text segments window 210. Further, given the suggested alternative text segments, the lattice generation module constructs the aforementioned lattice-based representation of alternative suggested text segments.

The lattice-based representation of alternative suggested text segments is then presented to the user in an interactive word lattice display window 215. Further, the exemplary user interface 200 may include various menu items, such as, for example, a refresh 220 menu item, a show/hide suggested text segments 225 menu item, a show/hide lattice 230 menu item. In addition, the exemplary user interface 200 may also include typical controls 235 for minimizing, maximizing, windowing, or closing the user interface. The user interface 200 may also include scroll bars (240, 245 and 250) or the like for scrolling through any of the aforementioned windows, as needed. Note that FIG. 3, discussed in Section 2.3, provides an example of the UI of FIG. 2 populated with a user entered input text segment, a list of suggested alternative text segments, and a corresponding interactive word lattice.

2.0 Operational Details of the Interactive Word Lattice

The above-described program modules are employed for implementing various embodiments of the Interactive Word Lattice. As summarized above, the Interactive Word Lattice provides various techniques for implementing a user interface for interacting with and selecting user-modifiable paths through a lattice-based representation of alternative suggested text segments constructed in response to an input text segment for use in selecting an alternative to the input text segment. The following sections provide a detailed discussion of the operation of various embodiments of the Interactive Word Lattice, and of exemplary methods for implementing the program modules described in Section 1 with respect to FIG. 1 and FIG. 2. In particular, the following sections provides examples and operational details of various embodiments of the Interactive Word Lattice, including: an operational overview of the Interactive Word Lattice; language and machine translation models; lattice-based representations of alternative suggested text segments; additional user-interface considerations, and optional post-processing of selected alternative text segments.

2.1 Operational Overview

As noted above, the Interactive Word Lattice-based processes described herein provides a user interface for interacting with and selecting user-modifiable paths through a lattice-based representation of alternative suggested text segments constructed in response to an input text segment for use in selecting an alternative to the input text segment. More specifically, the user text segment input is provided to a trained contextual semantic similarity generation module that then returns a plurality of alternative text segments having the same or similar meaning as the original text input. An interactive graphical lattice-based representation of the alternative text segments is then presented to the user. Each sub-segment (e.g., word or phrase) in each alternative text segment represents a "node" of the lattice, while each connection between each sub-segment represents a lattice "edge. Both nodes and edges are user modifiable. Each possible path through the lattice corresponds to a different alternative text segment. Users select a path through the lattice to select an alternative text segment to the original text input.

In general, the Interactive Word Lattice may be implemented as a standalone process or application, or as a component within a wide variety of applications. For example, the Interactive Word Lattice can be implemented within a proofing tool such as a spelling checker, a writing assistance tool such as contextual (intelligent) thesaurus, a community editing framework for documents such as in a wiki, a translation memory, a machine translation engine that provides multiple outputs, a query suggestion provider in an internet search engine, etc. Clearly, the Interactive Word Lattice is not limited to the aforementioned examples, and may also involve a combination of any of the aforementioned applications, including, but not limited to, translation memory in conjunction with contextual thesaurus, or machine translation in conjunction with the output of a community editing application, machine translation in conjunction with contextual thesaurus and the output of a community editing application, etc.

For example, when implemented as part of a proofing tool within a word processing application, the user can select or enter an input text segment then request alternatives via a context sensitive menu or other UI action. Such a request will initiate an instance of the Interactive Word Lattice which will then use the contextual semantic similarity generation module to generate a list or set of alternative suggested text segments. However, regardless of whether the Interactive Word Lattice is implemented as a standalone application or is integrated into some other application, once the list or set of alternative suggested text segments has been generated, those text segments are then provided to the aforementioned lattice generation module for further processing to generate the lattice-based representation of alternative suggested text segments, as discussed in further detail in Section 2.3.

2.2 Contextual Semantic Similarity Generation Module

The contextual semantic similarity generation module has a variety of embodiments, its simplest being lexical substitution using a thesaurus or like database and a language model or models to evaluate the candidate text segment outputs in context, One such embodiment is a conventional machine translation machine translation engine. However, it should be understood that in the more general case, the Interactive Word Lattice uses any type of paraphrase generation or contextual thesaurus based techniques to process the input text segment. Machine translation is simply one example of such techniques that is not intended to limit the scope of paraphrase generation techniques that are adaptable for use by the Interactive Word Lattice.

As is well known to those skilled in the art, machine translation is a form of computational linguistics that uses computers to translate text or speech from one natural language to another, or to translate text or speech between styles or dialects within a single language. Many conventional machine translation techniques are designed around linguistic models that allow translation of whole phrases (as opposed to just single words) by training the model based on a large corpus using a variety of statistical techniques. The models may involve learning grammatical structures together with the word strings, and may map between word string, or between grammatical trees, or between grammatical trees and word strings, In other words, many such conventional techniques are adapted to automatically learn statistical or probabilistic language models based on collections of related textual materials that may include the same text translated into two or more different languages, various dictionaries, thesauruses, etc., and which sometimes includes significant human intervention during the training process.

Many such techniques provide phrase-based statistical or machine translation processes that are operable across languages (e.g., French to English) or within languages (e.g., English to English). Further, given sufficient amounts of training materials, these types of machine translation techniques such techniques can be adapted to particular language styles (e.g., particular authors, specific writing styles such as, for example, legal briefs in U.S. Supreme Court cases, etc., writing styles based on documents produced by a particular corporation or educational institution, dialects associated with particular groups or regions, etc.).

For example, the statistical language model could be trained to provide alternative phrases or sentences in response to a user text input that would read as if the author Ernest Hemmingway had written the alternative phrases. Consequently, since any paraphrase generation techniques capable of presenting alternative text segments to a user may be adapted for use by the Interactive Word Lattice, this document will not focus on such techniques, and will instead focus on the interactive user interface for presenting the alternative text segments to the user. Further, since a wide variety of linguistic, stylistic, or dialect-based models may be adapted for use by the Interactive Word Lattice, in various embodiments, the user is presented with an option for selecting a particular language models from a set of one or more different models trained on particular languages, grammatical styles, etc. Note that the various techniques for training language models (and similar processes) for providing alternative suggested text segments for a text input are well known to those skilled in the art, and will not be described in detail herein.

In other words, the Interactive Word Lattice simply adapts any type of paraphrase generation or contextual thesaurus based techniques or models that are capable of paraphrasing the input text segment to construct the aforementioned contextual semantic similarity generation module. The contextual semantic similarity generation module then provides a set or collection of alternative suggested text segments in response to the original input text segment provided or otherwise selected by the user.

2.3 Lattice-Based Representation of Alternative Suggested Segments

As noted above, the lattice generation module receives the list or set of alternative suggested text segments and constructs an interactive lattice of sub-segments (nodes, comprising words or sequences of words), with edges (links) between sub-segments. Note that while the lattice is generally illustrated herein showing single words in each node, a node may actually consist of more than one word.

In general, the Interactive Word Lattice provides an editable interactive graphical interface display of the lattice to the user. In contrast to lattice-like constructs that provide graphs of associated words, (e.g., a visual thesaurus that shows connections between related words) the lattice constructed by the Interactive Word Lattice does not directly connect similar terms, but rather presents them as parallel text strings connected by linguistic context (see FIG. 4, as discussed below, for an example of this lattice-based parallel layout). The lattice provided by the Interactive Word Lattice is thus a representation of different paths that the user can choose in order to obtain a string of words (e.g., a phrase) having the same or similar meaning to the original input text segment. Again, as noted above, it should be understood that the Interactive Word Lattice uses any type of paraphrase generation or contextual thesaurus based techniques to process the input text segment. Machine translation is simply one example such techniques that is not intended to limit the scope of paraphrase generation techniques that are adaptable for use by the Interactive Word Lattice.

Figure 3:
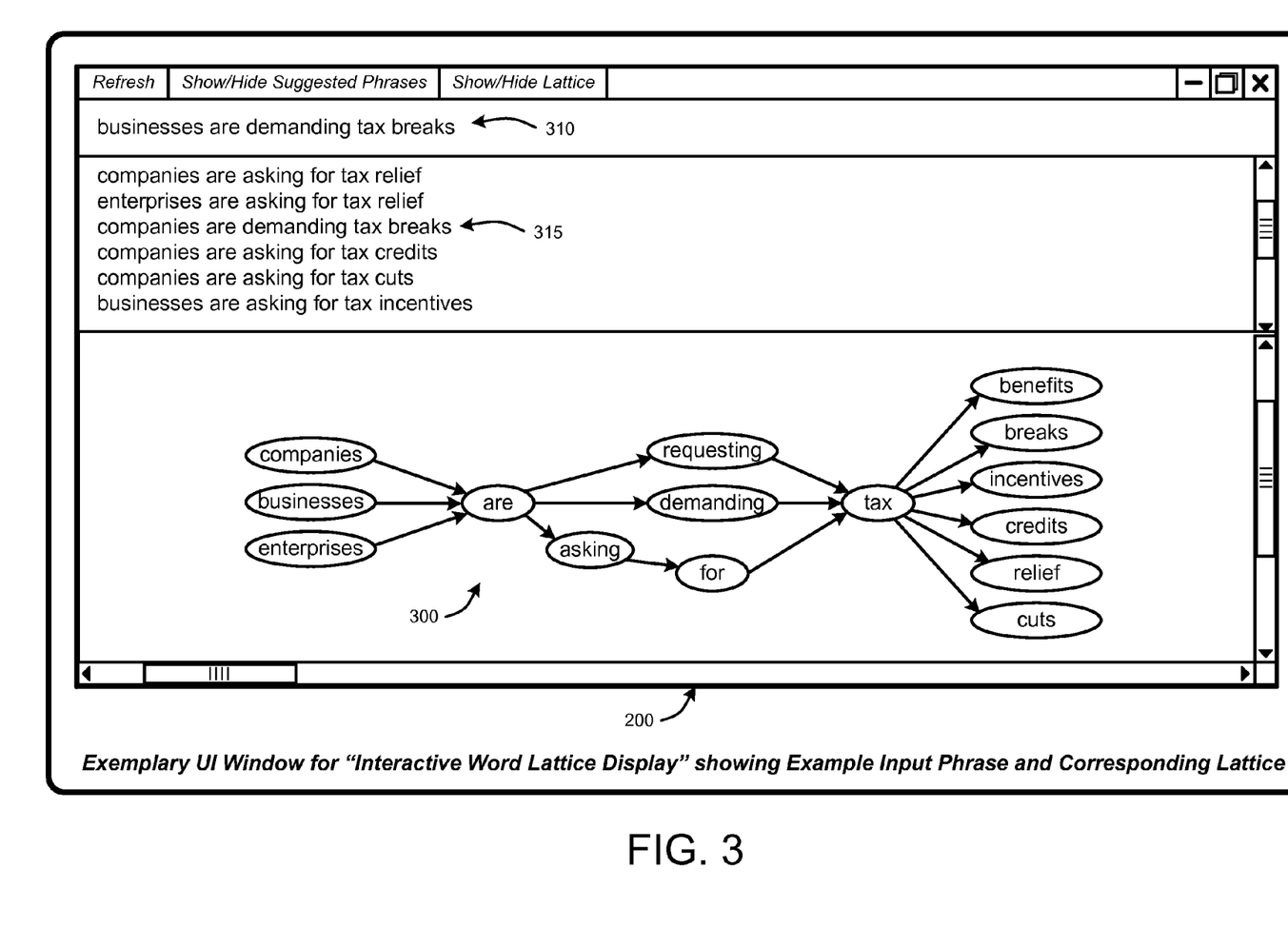
FIG. 3 provides an exemplary user interface layout of the Interactive Word Lattice, showing an exemplary user text input, a set of alternative suggested text segments, and the corresponding lattice-based representation of alternative suggested text segments, as described herein.

An example of a user interface window illustrating the lattice generated in response to an input text segment is provided by FIG. 3. Note that FIG. 3 illustrates a user interface similar to FIG. 2 that has been populated to show an input text segment, corresponding suggested alternative text segments, and the corresponding lattice-based representation of alternative suggested text segments.

More specifically, FIG. 3 illustrates the user interface 200 with the user entered input text segment 310 "businesses are demanding tax breaks". In this example, suggested alternate phrases 315 for the input text segment 310 include:
1. "companies are asking for tax relief"
2. "enterprises are asking for tax relief"
3. "companies are demanding tax breaks"
4. "companies are asking for tax credits"
5. "companies are asking for tax cuts"
6. "businesses are asking for tax incentives"

Note that the above list of suggested alternate text segments 315 does not represent a complete list of all possible text segments that can be generated from corresponding word lattice 300. In fact, a total of fifty-four different paths through the word lattice 300 can be selected, thereby resulting in fifty-four different alternative text segments. In particular, word lattice 300 illustrates nodes corresponding to each word, with edges (represented by arrows) that show possible paths from each node to one or more other nodes. In addition, it should be noted that FIG. 3 represents the edges of the word lattice 300 using arrows to indicate a left to right directionality of the language. However, in the more general case, there is no need to use arrows on the edges to indicate directionality, and it should be understood that directionality can be either way, e.g., in right to left languages like Hebrew and Arabic, the word lattice 300 can naturally proceed from right to left. In addition, as discussed above, the user selects a particular alternative text segment via selection of a complete path through the word lattice 300. However, also as discussed above, the user is provided with the capability to edit, add, and/or delete both nodes and edges of the word lattice 300.

In fact, FIG. 4 illustrates an example of the word lattice 300 of FIG. 3 that has been edited by the user to add several nodes and edges. In particular, in this example, the user has added a node 400 for the word "demand". Corresponding edges 410 from the nodes for the words "companies, "businesses" and "enterprises" have also been added from those nodes to node 400 for the word "demand". In addition, in this example, the user has added a node 415 for the word "calling", with a corresponding edge 420 from the node for the word "are" to the node 415 for the word "calling" and a corresponding edge 425 from the node 415 for the word "calling" to the node for the word "for".

Interestingly, the addition of only two nodes and corresponding edges to the word lattice of FIG. 3 results in the new word lattice of FIG. 4 that has a total of ninety different paths through the word lattice that can be selected, thereby resulting in ninety different alternative text segments. This number is almost twice the number of possible paths from the word lattice of FIG. 3. Advantageously, the lattice-based representation of these ninety possible alternative text segments is substantially more compact and easier for the user to navigate than would be a simple list of the ninety possible alternative text segments enabled by the word lattice of FIG. 4. Finally, note that FIG. 4 also illustrates a selected path through the word lattice via highlighted nodes and edges, with a resulting selection of the text segment "businesses are calling for tax relief" based on the original input text segment of "businesses are demanding tax breaks".

2.4 Additional User-Interface Considerations

In general, given the list or set of alternative suggested text segments, the Interactive Word Lattice generates the lattice-based representation of alternative suggested text segments, as described in Section 2.3. In some cases, the lattice can be generated directly within a host application, e.g., the Interactive Word Lattice can expose the word lattice directly within a word processing or other application (via a popup, drop-down, context sensitive tool, etc.) rather take the optional additional step of generating a collection of alternative suggested text segments that are presented to the user (e.g., suggested text segments window 210 of FIG. 2).

A simple example of this concept is that by selecting a text segment such as "businesses are demanding tax breaks" within the text of a word processor document open in a word processor application, a popup or other window can be automatically opened to show a corresponding word lattice, such as illustrated by FIG. 4, directly within the word processor application. Then, as soon as the user selects a path through that word lattice, the corresponding alternative text segment simply replaces the originally selected text of "businesses are demanding tax breaks" within the open word processor document. The open popup or window displaying the word lattice can then either close automatically upon path selection, or it can remain open to allow the user further interaction with the lattice, if desired. Consequently, it should be understood that the Interactive Word Lattice can be implemented as a "popup", "dropdown", "context sensitive tool", or any other desired UI format that is embedded within any other application that allows or makes use of user-editable or user-selectable text segments.

As noted above, the user is provided with the capability to interact with the word lattice in order to modify nodes and/or edges of the lattice, or to make a path selection through the lattice in order to select a particular alternative text segment. Clearly, the specifics of the interactivity will depend on the application, and may include highlighting text, then using a context sensitive menu, dedicated menu, popups, pointer double clicks, pointer right-clicks, etc. In other words, the processes enabled by the Interactive Word Lattice may be implemented using any desired combination of user interface techniques that, in general, allow entry or selection of an input text segment, and selection and/or editing of a path (e.g., node or edge "clicks" via a pointing device for path selection) through a corresponding word lattice that is displayed for the user.

For example, by clicking on nodes and edges, the user can select a path or paths through the lattice, and/or edit or delete nodes or edges. The words in the nodes may be edited to remove errors or undesirable terms, or replace a term entirely. In various embodiments, the lattice can be modified directly by allowing the user to introduce new nodes and edges, with the set of alternative suggested text segments being updated accordingly.

Further, if the optional set of alternative suggested text segments is displayed to the user, in various embodiments, the text segment in that set that corresponds to the choices made by user selection of a path through word lattice is highlighted. Conversely, in various embodiments of the Interactive Word Lattice, a particular path through the lattice is highlighted when the user selects a corresponding one of the set of alternative suggested text segments from the optional list presented to the user.

In another interesting application of the Interactive Word Lattice, multiple users may be allowed to interact with the same document or phrase at the same time, with each user then selecting any desired path through the word lattice. In this case, either a lead user or author can confirm or reject the corresponding text segment changes produced by the lattice path selections of the other users, or a simple majority selection for any particular text segment or lattice path will result in selection of the corresponding alternative text segment.

These types of embodiments of the Interactive Word Lattice can be considered as a form of crowdsourcing-based editing.

In yet another embodiment of the Interactive Word Lattice, the user is presented with a UI that allows the user to select some or all of the text of a particular path through the lattice. The selected text is then used to initiate an automatic lookup or search of one or more networks, databases, documents, etc., for providing additional information to the user related to that selected text. Examples of such additional information returned by such processes includes, but is not limited to, documents, images, applications, information, and dictionary definitions relating to the selected text.

2.5 Optional Post-Processing of Selected Alternative Segments

As noted above, in various embodiments of the Interactive Word Lattice, the post-processing module (see FIG. 1) either performs additional processing on the user selected alternative text segment or passes the user's path selection and thus the corresponding selection of an alternative text segment to one or more applications in a format that can be consumed by the application.

For example, if the application is a document processing application, this format can be a single string of words and/or characters that is used to replace another string in the document. If it is a community or crowdsourcing editing application, the post-processing module can return a vote for an existing candidate among several contributed by users. In other words, in the case of crowdsourcing-based embodiments, one or more users can "vote" or otherwise select a particular candidate or path through the lattice, with the candidate receiving the most votes or selections being selected for further use (e.g., community-based document editing).

In the case of a search application, the post-processing module can translate the original or user-edited lattice into a query, for example, given the lattice shown in FIG. 3, it could translate a simple query "tax breaks" into query language structured query of "tax word:(breaks benefits incentives credits relief cuts)" so that the search engine can perform an OR search on the alternative terms (e.g., breaks benefits incentives credits relief cuts) in combination with the word "tax". In other words, in this example, alternative corresponding nodes of the lattice are used to enable alternative parallel searches for corresponding alternative suggested text segments (e.g., "tax breaks", "tax benefits", "tax incentives", "tax credits", etc.).

In various embodiments, the post-processing module passes the user selected path and/or alternative text segment to the database of user selections (see FIG. 1) that stores the user selection along with other data relating to the generated lattice, for example, an original input text segment and the suggestions made by the contextual semantic similarity generation module. This data can then be used for various purposes such as to improve the various language models used by the contextual semantic similarity generation module (see FIG. 1).

Another example of post-processing enabled by the Interactive Word Lattice is an embodiment where the user performs a search on a set of documents, stored on the world wide web, on an intranet, or in one or more databases, in order to determine which selected phrases (corresponding to one or more of the possible paths through the lattice) can be found and with what frequency. In other words, such embodiments enable numerous actions such as the validation of a text string or text segment for the purposes of editing, rather than simply searching for information represented by or related to the selected phrase.

3.0 Exemplary Operating Environments

Figure 5:
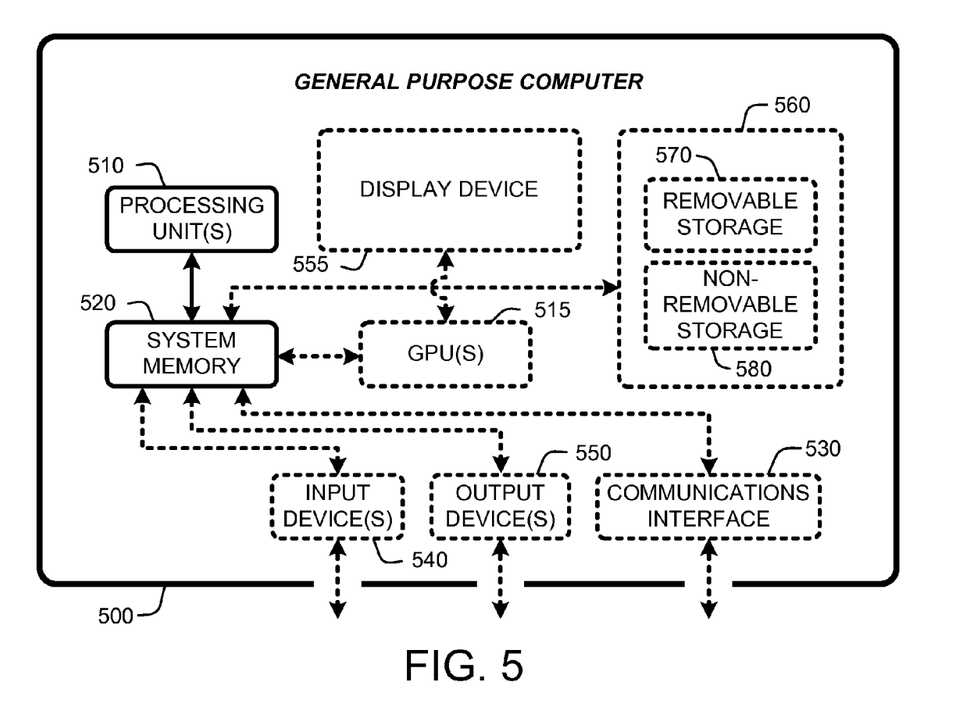
FIG. 5 is a general system diagram depicting a simplified general-purpose computing device having simplified computing and I/O capabilities for use in implementing various embodiments of the Interactive Word Lattice, as described herein.

The Interactive Word Lattice described herein is operational within numerous types of general purpose or special purpose computing system environments or configurations. FIG. 5 illustrates a simplified example of a general-purpose computer system on which various embodiments and elements of the Interactive Word Lattice, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Interactive Word Lattice, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computing device 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Interactive Word Lattice described herein, or portions thereof, may be stored, received, transmitted, or read from any desired combination of computer or machine readable media or storage devices and communication media in the form of computer executable instructions or other data structures.

Finally, the Interactive Word Lattice described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a "cloud" of one or more devices (i.e., a "cloud computing" environment), that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Interactive Word Lattice has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Interactive Word Lattice. It is intended that the scope of the invention be limited not by this detailed description, but rather by the claims appended hereto.

What is claimed is:

1. A computer-readable storage device having computer executable instructions stored therein for implementing an interactive user interface for providing alternative suggested text segments to a user, said instructions causing a computing device to perform actions comprising:
    receiving an input text segment comprising a sequence of two or more words, said input text segment having a linguistic meaning;
    processing the input text segment without the use of wildcards using one or more contextual semantic similarity generation modules to generate a plurality of suggested alternative text segments, each alternative text segment comprising a different sequence of words, each alternative text segment having a linguistic meaning similar to the linguistic meaning of the input text segment such that each alternative text segment is related to input text segment by linguistic context;
    constructing a lattice-based representation of the plurality of suggested alternative text segments as parallel text segments connected by linguistic context, and wherein each node of a plurality of nodes of the lattice includes one or more contiguous words of one of the alternative suggested text segments, and wherein edges of the lattice connect each node to one or more other nodes of the lattice such that each of the plurality of suggested alternative text segments are fully represented by the lattice;
    displaying the lattice in a user interface window;
    providing a user interface to select one of the suggested alternative text segments by selecting a path that traverses the lattice through a plurality of connected nodes from a beginning of the displayed lattice to an end of the displayed lattice; and
    wherein each possible path through the lattice corresponds to a sequence of nodes and edges that represents a different one of the suggested alternative text segments.

2. The computer-readable storage device of claim 1 wherein the user interface allows the user to add one or more nodes to the lattice, with each added node including one or more contiguous words, along with edges to connect the added nodes to one or more existing nodes in the lattice.

3. The computer-readable storage device of claim 1 wherein the user interface allows the user to edit the words in one or more nodes of the lattice.

4. The computer-readable storage device of claim 1 wherein the user interface allows the user to delete one or more nodes and corresponding edges from the lattice.

5. The computer-readable storage device of claim 1 wherein the user interface allows the user to add one or more edges between nodes of the lattice.

6. The computer-readable storage device of claim 1 wherein the user interface allows the user to delete one or more edges between nodes of the lattice.

7. The computer-readable storage device of claim 1 wherein the suggested alternative text segments are provided in a language style that differs from a language style of the input text segment.

8. The computer-readable storage device of claim 1 wherein the suggested alternative text segments are provided in a language different from a language of the input text segment.

9. The computer-readable storage device of claim 1 further comprising storing user path selection information with the corresponding alternative text segment in combination with the user input text segment for use in updating one or more of the contextual semantic similarity generation modules.

10. The computer-readable storage device of claim 1 further comprising using the alternative text segment corresponding to the user path selection as a new user text segment input for use in generating a new set of one or more suggested alternative text segments and constructing and displaying a new lattice-based representation of the new set of suggested alternative text segments.

11. The computer-readable storage device of claim 1 wherein at least a portion of the computer executable instructions are executed within a distributed computing environment.

12. The computer-readable storage device of claim 1 wherein the user interface is embedded within an application program to allow the user to modify text segments within that application by selecting a path through the displayed lattice via the user interface.

13. The computer-readable storage device of claim 1 further comprising instructions for translating the nodes and edges of the lattice into a structured query, and providing that structured query to a search engine for use in performing parallel searches for two or more of the different text segments of the set of suggested alternative text segments.

14. The computer-readable storage device of claim 1 further comprising instructions for receiving inputs from multiple users to enable crowdsourcing-based selection of a path through the lattice.

15. A system for implementing an interactive user interface for providing alternative suggested text segments to a user:
 a device for receiving an input text segment comprising a sequence of two or more words and not including wildcards, said input text segment having a linguistic meaning;
 a device for processing the input text segment to generate a plurality of suggested alternative text segments, each alternative text segment comprising a different sequence of words having a linguistic meaning similar to the linguistic meaning of the input text segment such that each alternative text segment is related to input text segment by linguistic context;
 a device for constructing a lattice-based representation of the plurality of suggested alternative text segments as parallel text segments connected by the linguistic context, and wherein each of a plurality of nodes of the lattice includes one or more contiguous words of one of the alternative suggested text segments, and wherein edges of the lattice connect each node to one or more other nodes of the lattice such that each of the plurality of suggested alternative text segments are fully represented by the lattice;
 a device for displaying the lattice in a user interface window; and
 wherein the user interface further allows the user to select a path that traverses the lattice through a plurality of connected nodes from a beginning of the displayed lattice to an end of the displayed lattice, and wherein each possible path through the lattice corresponds to a sequence of nodes and edges that represents a different one of the suggested alternative text segments.

16. The system of claim 15 wherein the user interface is embedded within an application program to allow the user to modify text segments within that application by selecting a path through the displayed lattice via the user interface.

17. The system of claim 15 further comprising a device for translating the nodes and edges of the lattice into a structured query, and a device for providing that structured query to a search engine for use in performing parallel searches for two or more of the different text segments of the set of suggested alternative text segments.

18. A method for providing alternative suggested text segments to a user, comprising using a computing device for:
 receiving an input text segment comprising a sequence of two or more words, said input text segment having a linguistic meaning;
 processing the input text segment without the use of wildcards to generate a plurality of suggested alternative text segments, each alternative text segment comprising a different sequence of words having a linguistic meaning similar to the linguistic meaning of the input text segment such that each alternative is related to input text segment by linguistic context;
 constructing a lattice-based representation of the plurality of suggested alternative text segments as parallel text segments connected by the linguistic context, and wherein each node of a plurality of nodes of the lattice includes one or more contiguous words of one of the alternative suggested text segments, and wherein edges of the lattice connect each node to one or more other nodes of the lattice such that each of the plurality of suggested alternative text segments are fully represented by the lattice;
 displaying the lattice in a user interface window; and
 selecting an alternative text segment by identifying a path that traverses the lattice through a plurality of connected nodes from a beginning of the displayed lattice to an end of the displayed lattice, and wherein each possible path through the lattice corresponds to a different one of the suggested alternative text segments.

19. The method of claim 18 further comprising receiving inputs from a plurality of users to enable crowdsourcing-based selection of a path through the lattice.

20. The method of claim 18 wherein the user interface is embedded within an application program to allow the user to modify text segments within that application by selecting a path through the displayed lattice via the user interface.

* * * * *